United States Patent
Kurata et al.

(10) Patent No.: US 12,106,215 B2
(45) Date of Patent: Oct. 1, 2024

(54) KNOWLEDGE TRANSFER BETWEEN RECURRENT NEURAL NETWORKS

(71) Applicant: INTERNATIONAL BUSINESS MACHINES CORPORATION, Armonk, NY (US)

(72) Inventors: Gakuto Kurata, Tokyo (JP); Kartik Audhkhasi, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/168,794

(22) Filed: Feb. 14, 2023

(65) Prior Publication Data
US 2023/0196107 A1   Jun. 22, 2023

Related U.S. Application Data

(63) Continuation of application No. 16/115,868, filed on Aug. 29, 2018, now Pat. No. 11,625,595.

(51) Int. Cl.
 *G06N 3/08* (2023.01)
 *G06N 3/044* (2023.01)
 *G06N 3/045* (2023.01)

(52) U.S. Cl.
CPC ............ *G06N 3/08* (2013.01); *G06N 3/044* (2023.01); *G06N 3/045* (2023.01)

(58) Field of Classification Search
CPC .. G06N 3/00; G06N 5/00; G06N 7/00; G06N 10/00; G06N 20/00; G06N 99/00
See application file for complete search history.

(56) References Cited

U.S. PATENT DOCUMENTS

| 9,263,036 B1 | 2/2016 | Graves | |
| 2016/0051163 A1* | 2/2016 | Deouell | A61B 5/316 600/544 |
| 2018/0232632 A1* | 8/2018 | Kaskari | G10L 15/16 |

FOREIGN PATENT DOCUMENTS

WO   WO-2019116604 A1 *  6/2019  ............ G10L 15/02

OTHER PUBLICATIONS

Yoon Kim, & Alexander M. Rush. (2016). Sequence-Level Knowledge Distillation. (Year: 2016).*

Suyoun Kim, Michael L. Seltzer, Jinyu Li, & Rui Zhao. (2018). Improved training for online end-to-end speech recognition systems. (Year: 2018).*

(Continued)

*Primary Examiner* — Ben M Rifkin
*Assistant Examiner* — Johnathan R Germick
(74) *Attorney, Agent, or Firm* — Tutunjian & Bitetto, P.C.; Robert Richard Aragona

(57) ABSTRACT

Knowledge transfer between recurrent neural networks is performed by obtaining a first output sequence from a bidirectional Recurrent Neural Network (RNN) model for an input sequence, obtaining a second output sequence from a unidirectional RNN model for the input sequence, selecting at least one first output from the first output sequence based on a similarity between the at least one first output and a second output from the second output sequence; and training the unidirectional RNN model to increase the similarity between the at least one first output and the second output.

20 Claims, 10 Drawing Sheets

(56) References Cited

OTHER PUBLICATIONS

Graves, Alex, et al. "Framewise phoneme classification with bidirectional LSTM and other neural network architectures." Neural Networks, Jul. 2005, pp. 602-610, 18.5-6.
Amodei, Dario, et al. "Deep speech 2: End-to-End Speech Recognition in English and Mandarin." International Conference on Machine Learning, Jun. 2016, pp. 173-182.
Sak, Haçim, et al. "Fast and Accurate Recurrent Neural Network Acoustic Models for Speech Recognition." arXiv preprint arXiv, Jul. 2015, pp. 1468-1472, 1507.06947.
Kim, Suyoun, et al. "Improved Training for Online End-to-End Speech Recognition Systems." arXiv preprint arXiv, Nov. 2017, 5 pages, 1711.02212.
List of IBM Patents or Patent Applications Treated as Related dated Feb. 14, 2023, 2 pages.

\* cited by examiner

KNOWLEDGE TRANSFER BETWEEN RECURRENT NEURAL NETWORKS

BACKGROUND

Technical Field

The present invention relates to knowledge transfer between Recurrent Neural Networks. More specifically, the present invention relates to transferring knowledge from a bidirectional Recurrent Neural Network to a unidirectional Recurrent Neural Network.

Description of the Related Art

A Recurrent neural network (RNN) is capable of generating an output sequence of variable size based on an input sequence of variable size. Because of this capability, an RNN is useful for speech recognition, machine translation and any other applications that convert input sequences (e.g. audio sequence or original text) to output sequences (e.g. phoneme sequence or text translated into a target language).

A unidirectional RNN is an RNN that propagates an input sequence only in a forward direction. A unidirectional RNN can be used in an online system or real-time system because it requires data preceding the current time. On the other hand, a bidirectional RNN is an RNN that propagates an input sequence in both of forward and backward directions. A bidirectional RNN has usually better accuracy than a unidirectional RNN, but it has a longer latency since it can generate an output sequence only after an entire input sequence is received. Therefore, it is desired to develop a method of knowledge transfer (teacher-student modeling) that can improve the accuracy of a unidirectional RNN by training a student unidirectional RNN using a teacher bidirectional RNN.

SUMMARY

According to an embodiment of the present invention, a computer-implemented method is provided that includes: obtaining a first output sequence from a bidirectional Recurrent Neural Network (RNN) model for an input sequence; obtaining a second output sequence from a unidirectional RNN model for the input sequence; selecting at least one first output from the first output sequence based on a similarity between the at least one first output and a second output from the second output sequence; and training the unidirectional RNN model to increase the similarity between the at least one selected first output and the second output. In this way, the accuracy of the unidirectional RNN can be improved by using at least one selected outputs selected for the second output instead of using the first output sequence from the bidirectional RNN at the same time index.

Selecting the at least one first output may include searching for the at least one first output within a predetermined range in the first output sequence, wherein the predetermined range is determined from an index of the second output in the second output sequence. In this way, computational cost can be reduced compared to search the at least one first output in all over the first output sequence.

Training the unidirectional RNN model may include training the unidirectional RNN model to increase the similarity between a first distribution of the at least one first output and a second distribution of the second output. In this way, training loss is reduced when transferring knowledge from the bidirectional RNN to the unidirectional RNN.

The first distribution may be a weighted sum of distributions of each of the at least one first output. In this way, the first distribution can be a better target of the second distribution.

According to another embodiment of the present invention, a computer program product is provided that includes one or more computer readable storage mediums collectively storing program instructions that are executable by a processor or programmable circuitry to cause the processor or programmable circuitry to perform operations including: obtaining a first output sequence from a bidirectional RNN (Recurrent Neural Network) model for an input sequence, obtaining a second output sequence from a unidirectional RNN model for the input sequence, selecting at least one first output from the first output sequence based on a similarity between the at least one first output and a second output from the second output sequence; and training the unidirectional RNN model to increase the similarity between the at least one first output and the second output.

According to another embodiment of the present invention, an apparatus is provided that includes a processor or a programmable circuitry, and one or more computer readable mediums collectively including instructions that, when executed by the processor or the programmable circuitry, cause the processor or the programmable circuitry to obtain a first output sequence from a bidirectional RNN (Recurrent Neural Network) model for an input sequence, obtain a second output sequence from a unidirectional RNN model for the input sequence, select at least one first output from the first output sequence based on a similarity between the at least one first output and a second output from the second output sequence, and train the unidirectional RNN model to increase the similarity between the at least one first output and the second output.

According to another embodiment of the present invention, a computer-implemented method is provided that includes obtaining a first output sequence from a bidirectional RNN (Recurrent Neural Network) model for an input sequence, obtaining a second output sequence from a unidirectional RNN model for the input sequence, selecting at least one first output from the first output sequence, wherein the at least one first output includes a first output that appears sequentially earlier in the first output sequence than a second output appears in the second sequence, and training the unidirectional RNN model to increase the similarity between the at least one first output and the second output. Since the bidirectional RNN outputs a first output corresponding to a second output of a unidirectional RNN sequentially earlier, at least one appropriate output for the second output can be used to train the unidirectional RNN in this way.

According to another embodiment of the present invention, a computer program product is provided that includes one or more computer readable storage mediums collectively storing program instructions that are executable by a processor or programmable circuitry to cause the processor or programmable circuitry to perform operations including: obtaining a first output sequence from a bidirectional RNN (Recurrent Neural Network) model for an input sequence; obtaining a second output sequence from a unidirectional RNN model for the input sequence; selecting at least one first output from the first output sequence, wherein the at least one first output includes a first output that appears sequentially earlier in the first output sequence than a second output appears in the second sequence; and training the unidirectional RNN model to increase the similarity between the at least one first output and the second output.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
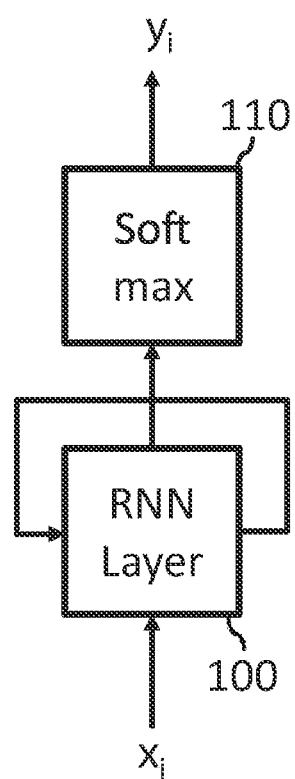
FIG. 1 shows an example of a unidirectional RNN according to an embodiment of the present invention.

FIG. 1 shows an example of unidirectional RNN 10. Unidirectional RNN 10 inputs an input $x_i$ and outputs an output $y_i$ in each index (e.g. cycle or time step). For example, unidirectional RNN 10 inputs $x_0$ and outputs $y_0$ at time t=0, inputs $x_1$ and outputs $y_1$ at t=1, and so on. Therefore, unidirectional RNN 10 can convert an input sequence ($x_0$, $x_1$, ... $x_{N-1}$) to an output sequence ($y_0$, $y_1$, ... $y_{N-1}$), both having a variable length N. Each input $x_i$ and each output $y_i$ are vectors including one or more vector elements.

Unidirectional RNN 10 includes RNN layer 100 and softmax 110. RNN layer 100 is a neural network layer including a plurality of neurons and a plurality of links (synapses). In this figure, unidirectional RNN 10 has one neuron layer, meaning each link is connected from an input node to a neuron and from a neuron to an output node. However, unidirectional RNN 10 may have multiple recurrent or non-recurrent neuron layers, meaning the plurality of links would also include at least one recursive link connected between neurons, and a recurrent link propagates information to the next index.

Softmax 110 receives an output of RNN layer 100, applies a softmax function to the output of RNN layer 100, and outputs the result as output $y_i$. The softmax function is a function that converts an output vector of RNN layer 100 to a probability distribution including a probability for each vector element of the output vector of RNN layer 100. Unidirectional RNN 10 may adopt any other output function depending on the application of unidirectional RNN 10.

In this example, unidirectional RNN 10 is based on a general RNN model. Instead of this implementation, unidirectional RNN 10 can be based on any type of RNN model such as LSTM (Long Short-Term Memory), Vanilla RNN, GRU (Gated Recurrent Unit) and so on.

Figure 2:
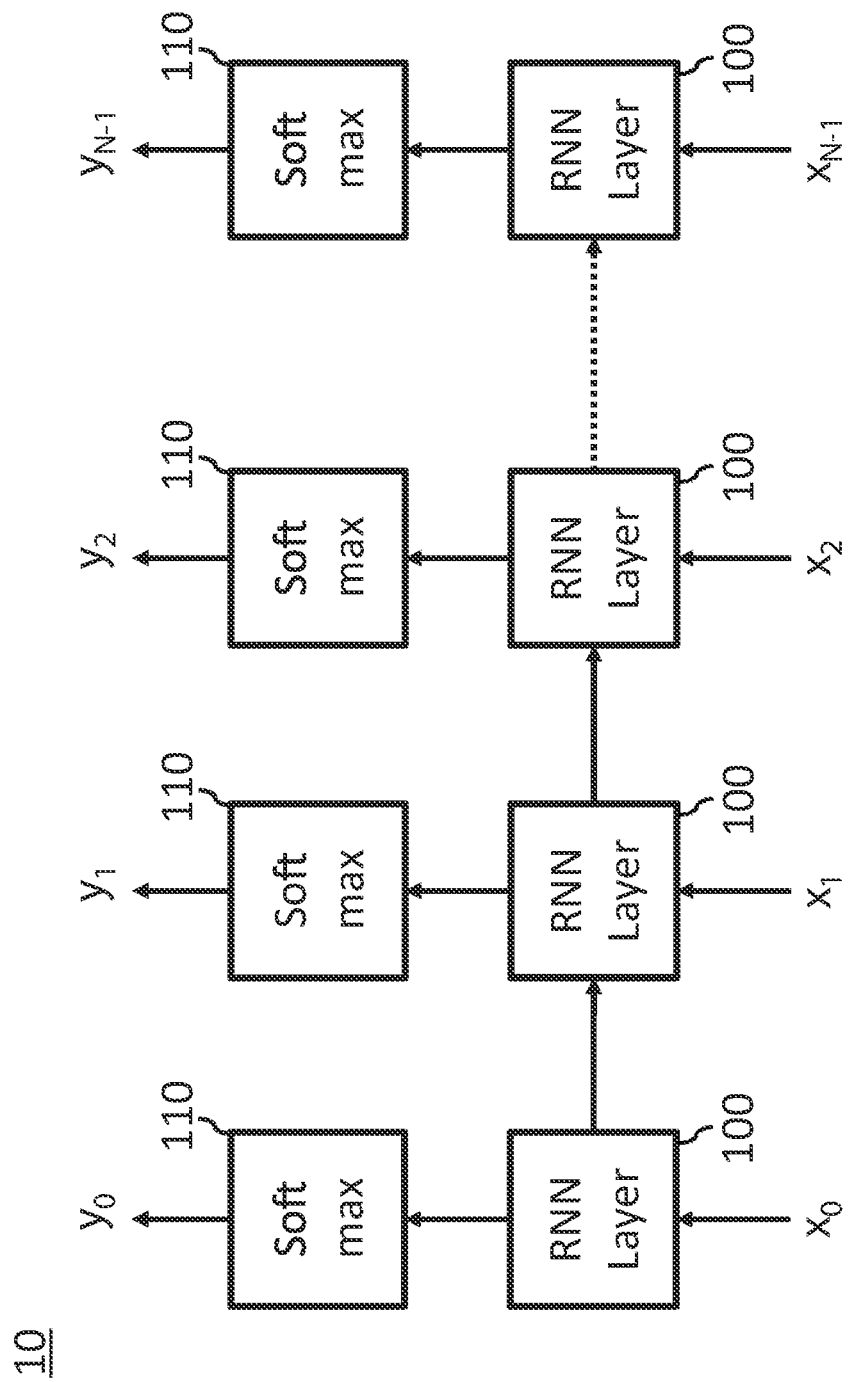
FIG. 2 shows an example of an unfolded unidirectional RNN according to an embodiment of the present invention.

FIG. 2 shows an example of a unidirectional RNN 10 unfolded along indices. Recurrent links in FIG. 1 that propagate information to the next index are described as links from RNN layer 100 to next RNN layer 100 along indices. Every unfolded RNN layer 100 has the same weight on each recurrent/non-recurrent link. As shown in this figure, information in RNN layer 100 is propagated toward RNN layer 100 at the next index. Therefore, unidirectional RNN 10 can determine output $y_i$ based on preceding and current inputs ($x_0$, ... , $x_i$), and succeeding inputs ($x_{i+1}$, ... , $x_{N-1}$) are not required for calculating output $y_i$. Therefore, unidirectional RNN 10 is useful for on-line applications such as end-to-end speech recognition.

Figure 3:
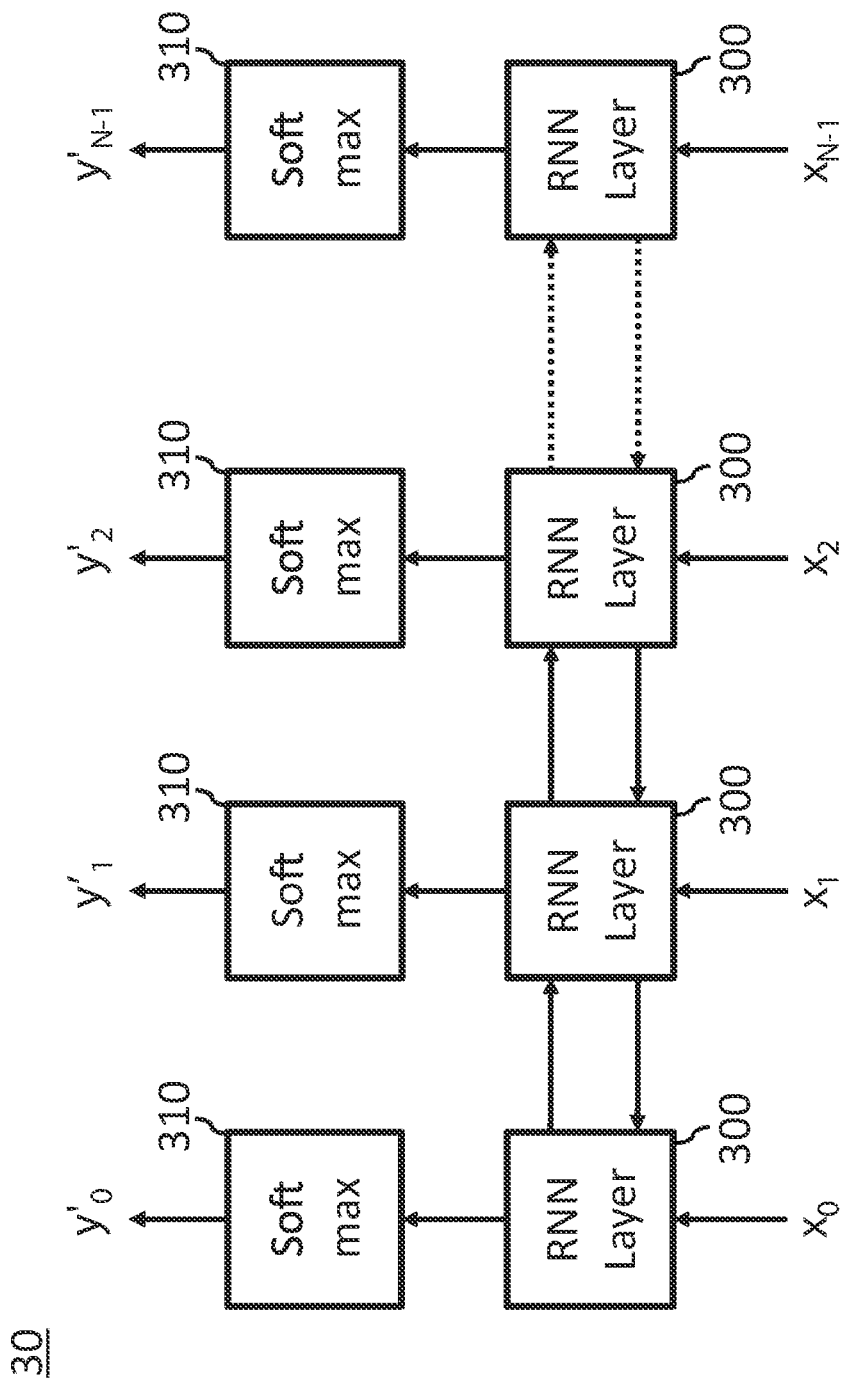
FIG. 3 shows an example of an unfolded bidirectional RNN according to an embodiment of the present invention.

FIG. 3 shows an example of a bidirectional RNN 30. Bidirectional RNN 30 converts an input sequence ($x_0$, $x_1$, ... $x_{N-1}$) to an output sequence ($y'_0$, $y'_1$, ... $y'_{N-1}$). Bidirectional RNN 30 includes one or more RNN layer 300 and one or more softmax 310. Each RNN layer 300 is a neural network layer including a plurality of neurons and a plurality of links. In this figure, bidirectional RNN 30 has one neuron layer at each index, however, bidirectional RNN 30 may have multiple recurrent or non-recurrent neuron layers at each index. Each RNN layer 300 at index 0 to N−2 includes at least one recurrent link (forward link) connected from a neuron at current index to a neuron at next index. Each RNN layer 300 at index 1 to N−1 includes at least one recurrent link (backward link) connected from a neuron at the current index to a neuron at the previous index.

Softmax 310 at index i (i=0, ... , N−1) receives an output RNN layer 300 at index i, applies a softmax function to the output of RNN layer 300 and outputs the result as output $y'_i$. Instead of using a softmax function, bidirectional RNN 30 may adopt any other output function depending on the application of bidirectional RNN 30.

In this example, bidirectional RNN 30 is based on a general RNN model. Instead of this implementation, bidirectional RNN 30 can be based on any type of RNN model such as LSTM (Long Short-Term Memory), Vanilla RNN, GRU (Gated Recurrent Unit) and so on.

As shown in this figure, information in RNN layer 300 is propagated toward RNN layer 300 at the next index and RNN layer 300 at the previous index. Therefore, bidirectional RNN 30 determines output $y'_i$ based on preceding and current inputs ($x_0$, ... , $x_i$), and also based on succeeding inputs ($x_{i+1}$, ... , $x_{N-1}$). Therefore, the whole input sequence must be obtained before bidirectional RNN 30 starts outputting a valid output sequence.

Figure 4:
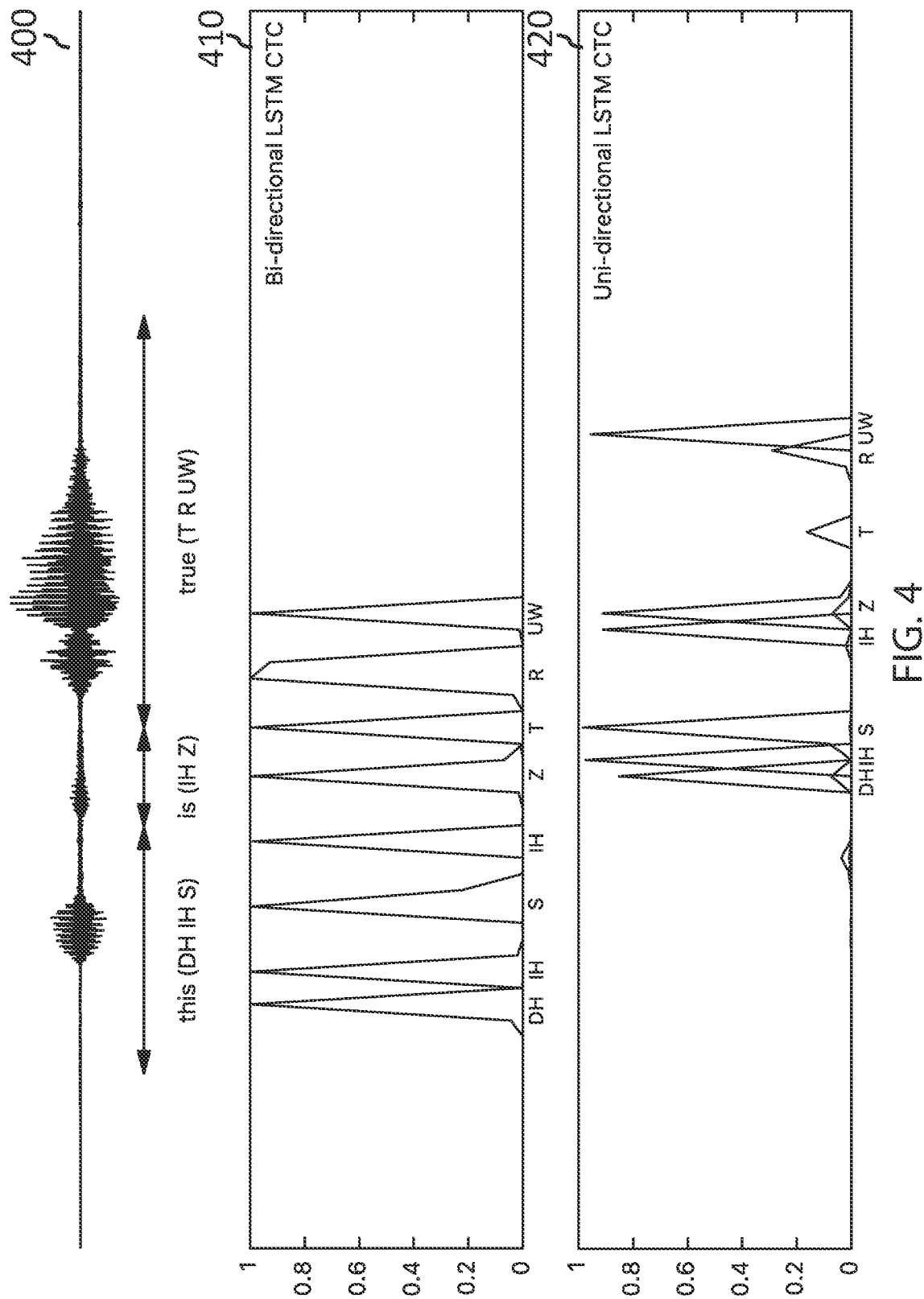
FIG. 4 shows an example output probability spikes of a bidirectional LSTM CTC model and a unidirectional LSTM CTC model in end-to-end speech recognition according to an embodiment of the present invention.

FIG. 4 shows an example output probability spikes of a bidirectional LSTM CTC model and a unidirectional LSTM CTC model in end-to-end speech recognition. In this application, unidirectional RNN 10 implemented as a unidirectional LSTM CTC and bidirectional RNN 30 implemented as a bidirectional LSTM CTC are trained by using training data including a plurality of pairs of an audio sequence (a speech sequence) as an input sequence and a corresponding phoneme sequence as an output sequence.

In this example, CTC (Connectionist Temporal Classification) training is used. In CTC training, if a phoneme sequence of "A B C" is pronounced in an audio sequence of length of 4 (e.g., 4 indices or 4 time steps), any possible combinations of A→B→C sequences of length 4 that can include a blank "_" are used as training output sequences. For example, "AABC", "ABBC", "ABCC", "ABC_", "AB_C", "A_BC", and "_ABC" are used as training output sequences. CTC training maximizes the summation of probabilities of possible phoneme sequences, and in doing so allows blank output for any time frame.

Waveform 400 in FIG. 4 shows a waveform of an audio sequence of a pronounced sentence "this is true" (as shown in waveform 400). This audio sequence is sampled at predetermined intervals such as 10 to 100 ms, and fed into trained unidirectional RNN 10 and bidirectional RNN 30. As shown in waveform 400, the phoneme sequence corresponding to the audio sequence of "this is true" is "DH IH S IH Z T R UW" where DH, IH, S, IH, Z, T, R, and UW are phoneme elements.

output sequence 410 shows an output sequence of bidirectional RNN 30 corresponding to the audio sequence of "this is true." In this example, each output of bidirectional RNN 30 and unidirectional RNN 10 is a probability distribution including a plurality of probabilities each of which is a posterior probability of occurrence of each phoneme. In this figure, an output spike having highest posterior probability in the probability distribution of each output of output sequence is shown as a representation of each output. Output sequence 420 shows an output sequence of unidirectional RNN 10 corresponding to the audio sequence of "this is true." Temporal (horizontal) axes of waveform 400, output sequence 410, and output sequence 420 in FIG. 4 are aligned.

By comparing the output spikes of bidirectional RNN 30 and unidirectional RNN 10, bidirectional RNN 30 and unidirectional RNN 10 output corresponding phoneme spikes at different indices or time steps. By comparing waveform 400 and output sequence 410, bidirectional RNN 30 outputs phoneme spikes at indices sequentially earlier than the indices at which the corresponding actual phoneme sounds are input. This is because each RNN layer 300 in bidirectional RNN 30 propagates information backwards, and thus each RNN layer 300 can output $y'_t$ based on future information. On the other hand, by comparing waveform 400 and output sequence 420, unidirectional RNN 10 outputs phoneme spikes at indices sequentially later than the indices at which the corresponding actual phoneme sounds are input.

Therefore, a conventional teacher-student modeling that use an output sequence from a teacher model as a training output sequence for training a student model may not improve the accuracy of student unidirectional RNN 10 if a bidirectional RNN 30 is used as a teacher model.

Figure 5:
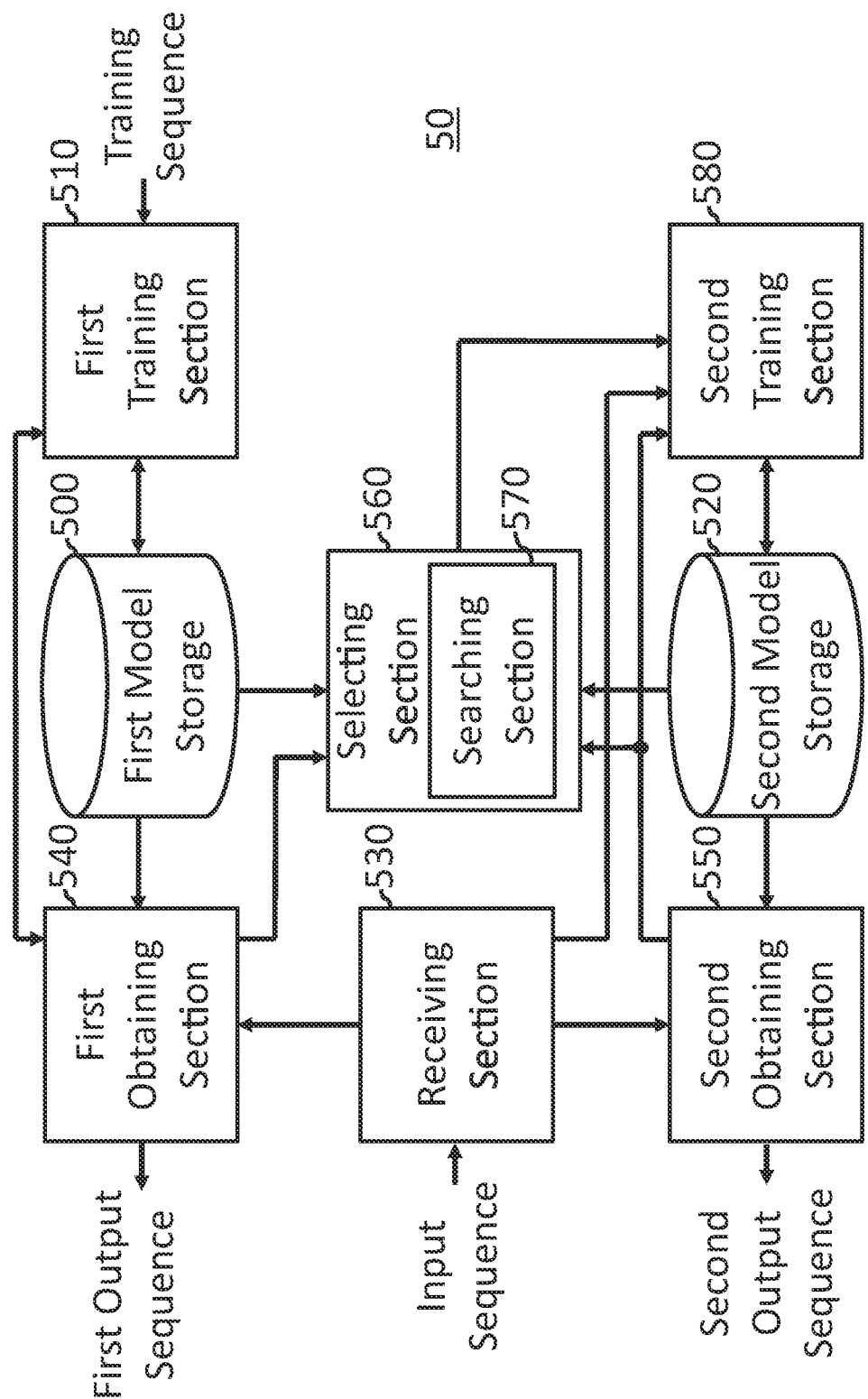
FIG. 5 shows an apparatus 50 according to an embodiment of the present invention.

FIG. 5 shows an apparatus 50 according to an embodiment of the present invention. Apparatus 50 can improve the accuracy of a unidirectional RNN 10 by training student unidirectional RNN 10 using teacher bidirectional RNN 30. Apparatus 50 includes first model storage 500, first training section 510, second model storage 520, receiving section 530, first obtaining section 540, second obtaining section 550, selecting section 560, and second training section 580.

First model storage 500 stores a bidirectional RNN model, which is a model of bidirectional RNN 30. In this implementation shown in this figure, the bidirectional RNN model is a data structure representing bidirectional RNN 30. In other implementations, the bidirectional RNN model can be implemented as a hardware device or implemented in a programmable device. The reference: "Framewise phoneme classification with bidirectional LSTM and other neural network architectures," by Alex Graves et al., Neural Networks, 18(5-6): page 602-610, July 2005 shows an example of a network structure and trainable parameters of an LSTM (as an example of an RNN). The reference also shows calculations for training parameters of the LSTM. In one implementation, apparatus 50 can use the LSTM shown in the reference and adopt the calculations shown in the same. In other implementations, apparatus 50 may use other RNN and adopt calculations for training parameters that are suitable for the RNN.

First training section 510 is connected to first model storage 500, and first training section 510 trains the bidirectional RNN model. In this embodiment, first training section 510 receives training sequences including a plurality of pairs of a training input sequence and a training output sequence, and trains the bidirectional RNN model in first model storage 500 before training the unidirectional RNN model stored in second model storage 520. In one embodiment, the training output sequence for training the bidirectional RNN model includes a plurality of training output each of which represents a selected output (e.g. a phoneme), instead of a probability distribution including a probability of occurrence for each output option. First training section 510 is also connected to first obtaining section 540, and first training section 510 sends a training input sequence to first obtaining section 540 and receives an output sequence of the current bidirectional RNN model stored in first model storage 500 from first obtaining section 540 described later in detail. First training section 510 updates parameters of the bidirectional RNN model to decrease the difference between the training output sequence and the output sequence calculated by first obtaining section 540. In one implementation, first training section 510 trains a bidirectional LSTM model by using Connectionist Temporal Classification (CTC) training. First training section 510 can adopt known training algorithms for updating parameters of the bidirectional RNN model.

Second model storage 520 stores a unidirectional RNN model, which is a model of unidirectional RNN 10. In this implementation shown in this figure, the unidirectional RNN model is a data structure representing unidirectional RNN 10. In other implementations, the unidirectional RNN model can be implemented as a hardware device or implemented in a programmable device.

Receiving section 530 receives an input sequence for training the unidirectional RNN model as a student by using the bidirectional RNN model as a teacher. For example, the input sequence is an audio sequence of a speech.

First obtaining section 540 is connected to receiving section 530 and receives the input sequence from receiving section 530. First obtaining section 540 is also connected to first model storage 500, and first obtaining section 540 obtains a first output sequence from the bidirectional RNN model in first model storage 500 for the input sequence by calculating the first output sequence based on the current bidirectional RNN model in first model storage 500 and the input sequence. For example, the first output sequence is a phoneme sequence corresponding to the input audio sequence of a speech. In this implementation, bidirectional RNN 30 is implemented by the data structure in first model storage 500 and a calculation part in first obtaining section 540.

Second obtaining section 550 is connected to receiving section 530 and receives the same input sequence from receiving section 530. Second obtaining section 550 is also connected to second model storage 520, and second obtaining section 550 obtains a second output sequence from a unidirectional RNN model in second model storage 520 for the input sequence by calculating the second output sequence based on the current unidirectional RNN model in second model storage 520 and the input sequence. For example, the second output sequence is a phoneme sequence corresponding to the input audio sequence of a speech. In this implementation, unidirectional RNN 10 is implemented by the data structure in second model storage 520 and the calculation part in second obtaining section 550.

Selecting section 560 is connected to first obtaining section 540 and second obtaining section 550. Selecting section 560 receives the first output sequence from first obtaining section 540 and the second output sequence from second obtaining section 550. As shown in FIG. 4, bidirectional RNN 30 outputs a vector element in the first output sequence sequentially earlier than unidirectional RNN 10 outputs a corresponding vector element in the second output sequence. Therefore, selecting section 560 selects, for each of one or more second outputs in the second output sequence, at least one first output from the first output sequence based on a similarity between the at least one first output and the second output from the second output sequence. By this feature, selecting section 560 can select at least one appropriate training output in the first output sequence for each second output in the second output sequence.

Selecting section 560 includes searching section 570. For each second output, searching section 570 searches for the at least one first output in the first output sequence.

Second training section 580 is connected to second model storage 520, receiving section 530, second obtaining section 550 and selecting section 560. Second training section 580 receives the input sequence from receiving section 530, the second output sequence from second obtaining section 550, the at least one first output for each second output from selecting section 560. Second training section 580 trains the unidirectional RNN model to increase the similarity between the at least one first output and the second output for each second output in the second output sequence. In this embodiment, second training section 580 updates parameters of the unidirectional RNN model in second model storage 520 to decrease the difference between the at least one first output and the second output sequence calculated by second obtaining section 550.

Figure 6:
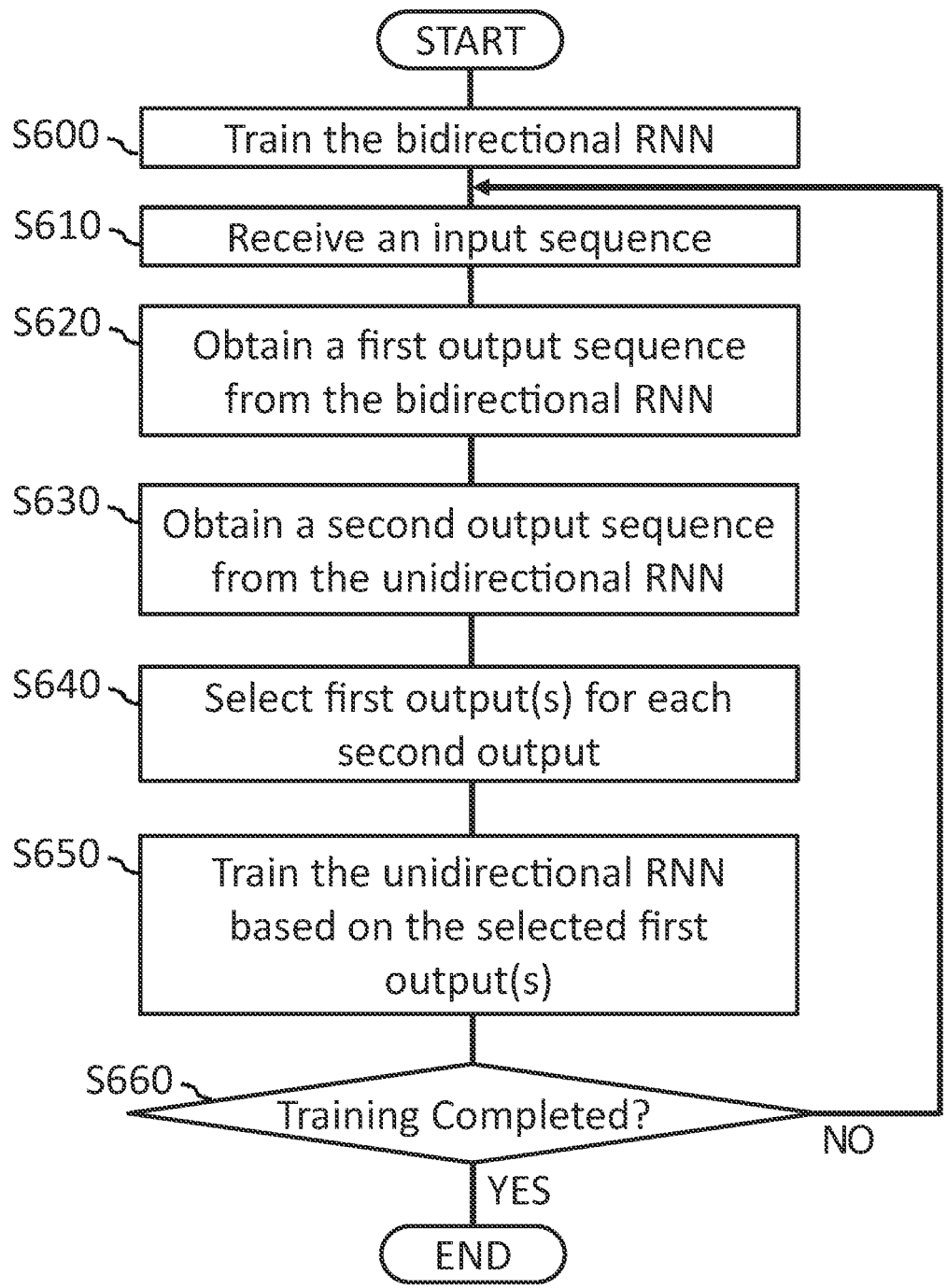
FIG. 6 shows an operational flow according to an embodiment of the present invention.

FIG. 6 shows an operational flow according to an embodiment of the present invention. The operations of FIG. 6 can be performed by an apparatus, such as apparatus 50 and its components that were explained in reference to FIG. 5. While the operational flow of FIG. 6 will be explained in reference to apparatus 50 and its components, the operational flow can be performed by other apparatus having different components as well.

At S600, first training section 510 receives training sequences and trains the bidirectional RNN model in first model storage 500. In one implementation, first training section 510 adopts CTC training.

At S610, receiving section 530 receives an input sequence for training the unidirectional RNN model as a student. In other embodiment, receiving section 530 also receives a training output sequence for the input sequence. In this case, receiving section 530 forwards the pair of the input sequence and the training output sequence to first training section 510 and first training section 510 then trains the bidirectional RNN model in first model storage 500 based on this pair of input and output sequences.

At S620, first obtaining section 540 obtains a first output sequence from the bidirectional RNN model in first model storage 500 for the input sequence received in S610.

At S630, second obtaining section 550 obtains a second output sequence from a unidirectional RNN model in second model storage 520 for the input sequence received in S610.

At S640, selecting section 560 selects, for each of one or more second output in the second output sequence, at least one first output from the first output sequence based on a similarity between the at least one first output and the second output of interest. Selecting section 560 can also do this by selecting, for each of the one or more first outputs in the first output sequence, one or more second outputs from the second output sequence based on a similarity between the first output of interest and the one or more second outputs. Searching section 570 searches for the at least one first output in the first sequence for each second output. In one implementation, searching section 570 can search for a predetermined number (e.g. one or more) of the first outputs having the highest similarity to the second output of interest. The selected first outputs are consecutive outputs in the first output sequence, but the selected first output can be non-consecutive outputs in other implementations.

In other implementations, selecting section 560 may select the at least one first output only for each second output of a part of the second output sequence.

At S650, second training section 580 trains the unidirectional RNN model by using the input sequence, the second output sequence, and the at least one selected first output for each second output to increase the similarity between the at least one selected first output and the corresponding second output. Second training section 580 can train the unidirectional RNN model with respect to each second output which has at least one corresponding first output.

At S660, apparatus 50 checks whether teacher-student training is completed for all input sequences received by receiving section 530. If there are some remaining input sequences, apparatus 50 repeats S610 to S650 for each of the remaining input sequences. In one embodiment, the operational flow of FIG. 6 is executed two or more times for each input sequence.

In this embodiment, apparatus 50 can select, for each second output, at least one first output which is similar to the second output. Therefore, apparatus 50 can improve the accuracy of unidirectional RNN 10 by using training outputs adjusted to unidirectional RNN 10 instead of just using the first output sequence from bidirectional RNN 30.

Figure 7:
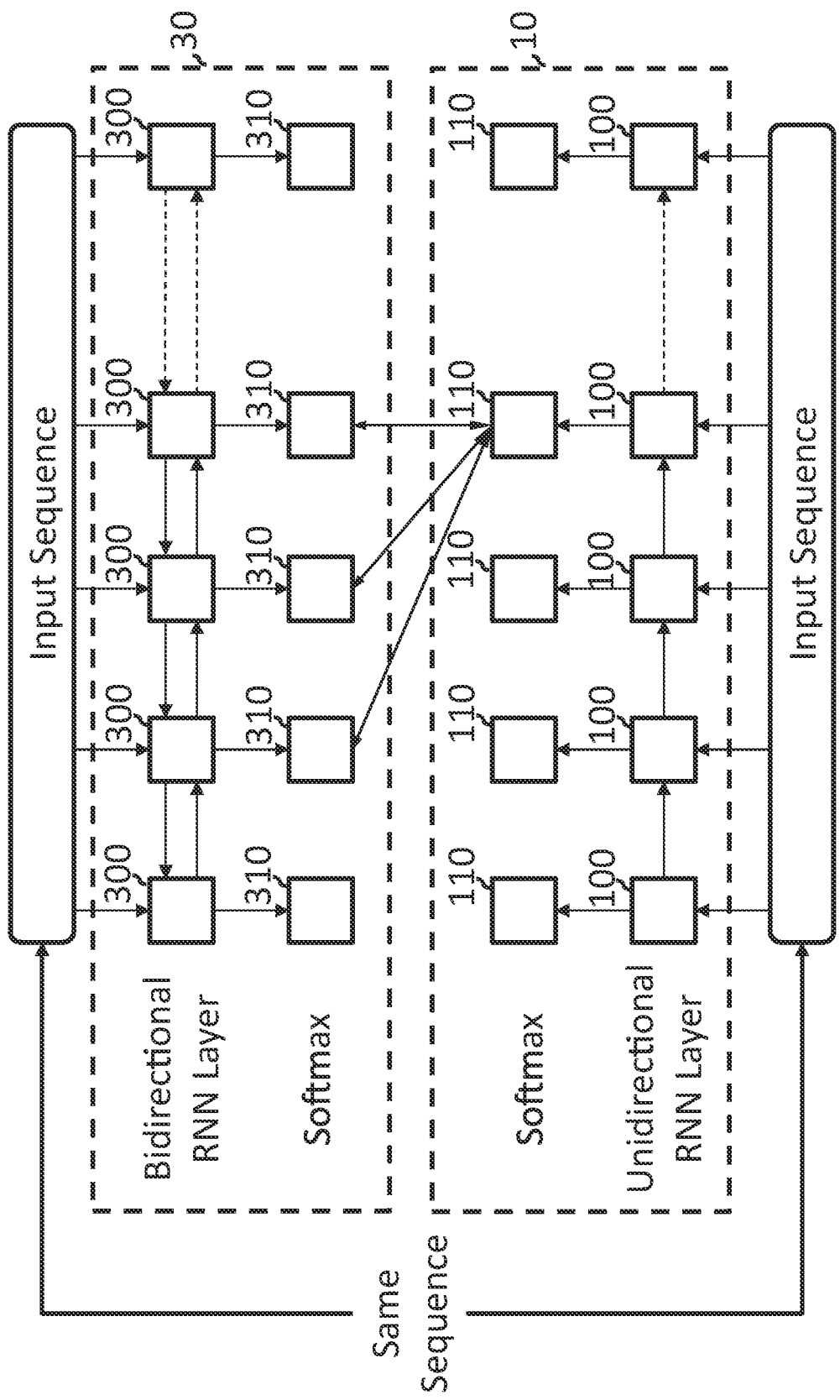
FIG. 7 shows an example of selecting at least one first output from a bidirectional RNN according to an embodiment of the present invention.

FIG. 7 shows an example of selecting at least one first output from a bidirectional RNN according to an embodiment of the present invention. While FIG. 7 will be explained in reference to apparatus 50 and its components, and the operational flow of FIG. 6, the example of FIG. 7 can be applied to other apparatus having different components and/or different operational flows as well.

At S620 and S630 in FIG. 6, the same input sequence is input to bidirectional RNN 30, which includes bidirectional RNN layers 300 and softmaxes 310, and unidirectional RNN 10, which includes unidirectional RNN layers 100 and softmaxes 110, and bidirectional RNN 30 and unidirectional RNN 10 output the first output sequence and the second output sequence, respectively. At S640 in FIG. 6, selecting section 560 compares each second output with each first output (at the same or different indices), and selects at least one first output based on a similarity between the at least one first output and the second output. Selecting section 560 can adopt some of the following selection policies.

(1) In one implementation, selecting section 560 selects the at least one first output including an output that appears sequentially earlier in the first output sequence than the second output of interest appears in the second output sequence. Even though some of the selected first outputs appear sequentially the same or later in the first output sequence, a first output that appears sequentially earlier than the second output of interest may improve the accuracy of unidirectional RNN 10.

(2) In one implementation, searching section 570 searches for the at least one first output between the earliest output (e.g. output $y_0$ in the first output sequence) and the first output at the time step that is the same as the second output of interest (e.g. same index). In other implementations, searching section 570 searches for the at least one first output within a predetermined range in the first output sequence. Selecting section 560 determines the predetermined range from an index of the second output of interest. Selecting section 560 can determine a range of fixed length (e.g. 10) relative to an index of the second output of interest (e.g. a range at fixed distance from the second output of interest). Based on this range, searching section 570 can search, for the second output)), in the second output sequence, the at least one first output among output $y'_{i-13}$ to $y'_{i-4}$ in the first output sequence as an example. In this implementation, selecting section 560 can search for the at least one first output within a limited range of the first sequence, and thus the computational cost can be decreased. If the range is large enough to cover the difference of time steps for bidirectional RNN 30 and unidirectional RNN 10 to output the same phoneme spike, then this does not decrease the accuracy of unidirectional RNN 10.

(3) In one implementation, selecting section 560 selects, for each second output from the second output sequence, at least one first corresponding output from the first output sequence, satisfying a condition that each second output appears in the same relative sequential order in the second output sequence as each of the at least one corresponding first output in the first output sequence. For example, selecting section 560 selects the at least one first output for the second output of interest at time step i in the second sequence between the first output next to the first output selected for the second output at time step i–1 and the first output at index i. This means selecting section 560 selects the first output between time step $y'_{i-9}$ and $y''_{i-1}$ for second output $y_i$ if first output $y'_{i-10}$ is selected for second output $y_{i-1}$. In this implementation, the order of phoneme spikes is maintained between the second outputs and the selected first outputs, and thus the assignment of the first outputs to the second outputs will be closer to the actual correspondence relationship. Selecting section 560 can also search for the at least one first output within the limited range of the first sequence, and thus the computational cost can be decreased.

(4) In one implementation, bidirectional RNN 30 and unidirectional RNN 10 output a probability distribution as each first output and each second output. For example, each first output $y'_i$ and each second output $y_i$ includes a plurality of probabilities each of which is a probability of occurrence of a corresponding phoneme (e.g. probability of occurrence of "DH" is X, probability of occurrence of "IH" is Y, and so on). In this case, selecting section 560 selects the at least one first output for the second output based on a similarity between a first distribution of the at least one first output and a second distribution of the second output. Second training section 580 trains the unidirectional RNN model to increase the similarity between a first distribution of the at least one first output and a second distribution of the second output.

Selecting section 560 can calculate the similarity between the first distribution and the second distribution based on a Kullback-Leibler (KL) divergence between the first distribution and the second distribution. KL divergence becomes a low value if the first distribution and the second distribution are similar, and KL divergence becomes a high value if the first distribution and the second distribution are different. Therefore, selecting section 560 can use a similarity measurement that becomes higher if KL divergence is lower and becomes lower if KL divergence is higher. In one example, selecting section 560 can use a similarity inversely proportional to KL divergence. In this case, second training section 580 trains the unidirectional RNN model to decrease Kullback-Leibler (KL) divergence between the first distribution and the second distribution.

(5) In one implementation, selecting section 560 selects one first output for each second output. In other implementations, selecting section 560 selects two or more first outputs for each second output. Selecting section 560 can select two or more consecutive first outputs in the first output sequence. In an implementation, selecting section 560 selects a fixed number of first outputs. Selecting section 560 merges selected first outputs to obtain a training output by calculating a weighted sum of the first outputs, averaging the two or more first outputs, or other operations. Selecting section 560 can determine weights of the weighted sum based on the similarity of each first output individually compared with the second output of interest. In this case, selecting section 560 assigns higher weight to a first output that is more similar to the second output of interest. Selecting section 560 can assign, for each first output of the two or more first outputs, a weight that is proportional to the similarity between each first output and the second output of interest. In other implementations, selecting section 560 can assign each weight based on the similarity by using different calculation. For example, selecting section 560 can assign a weight that is proportional to the similarity squared, cubed and so on.

Searching section 570 searches for the two or more consecutive outputs in the first output sequence based on a similarity between the two or more consecutive outputs and the second output of interest. This similarity can be equal to a similarity between a representative output of the two or more consecutive outputs (e.g., a weighted sum of the two or more consecutive outputs) and the second output of interest. For example, searching section 570 searches for the two or more consecutive outputs having the representative output most similar to the second output of interest.

In cases where each first output is a probability distribution as described in (4), selecting section 560 calculates the first distribution as a weighted sum of distributions of each of the two or more first outputs and selecting section 560 can determine weights of the weighted sum of distributions of each of the two or more first outputs based on similarity of distribution of each of the two or more first output individually compared with the second output of interest. In this case, selecting section 560 assigns higher weight to a first output having a distribution which is more similar to the distribution of the second output of interest. Therefore, the first distribution can be a better target of the second distribution than an averaged distribution of the first outputs.

(6) In one implementation, selecting section 560 selects at least one first output for each of all second outputs based on the similarity between the at least one first output and the second output of interest. In other implementations, selecting section 560 selects at least one first output for at least one second output based on the different selection rule. For example, if the same first output is selected for second outputs $y_{i-1}$ and $y_{i+1}$, then selecting section 560 can select the same first output to second output $y_i$ of interest. In another example, if bidirectional RNN 30 and unidirectional RNN 10 have the same number of indices, then selecting section 560 may not select first outputs appearing sequentially earlier in the first output sequence than several earliest second outputs $y_0$ to $y_m$ (m<N−1) appear in the second output sequence. In this case, selecting section 560 can select a first output (e.g. $y'_0$) sequentially earliest in the first output sequence for second outputs $y_0$ to $y_m$.

In other implementations, selecting section 560 may select at least one first output only for some of the second outputs.

In other implementations, the number of indices of bidirectional RNN 30 and unidirectional RNN 10 can be different. For example, bidirectional RNN 30 can have indices such as −2, −1, which are sequentially earlier than the earliest second output $y_0$ in the second sequence.

Figure 8:
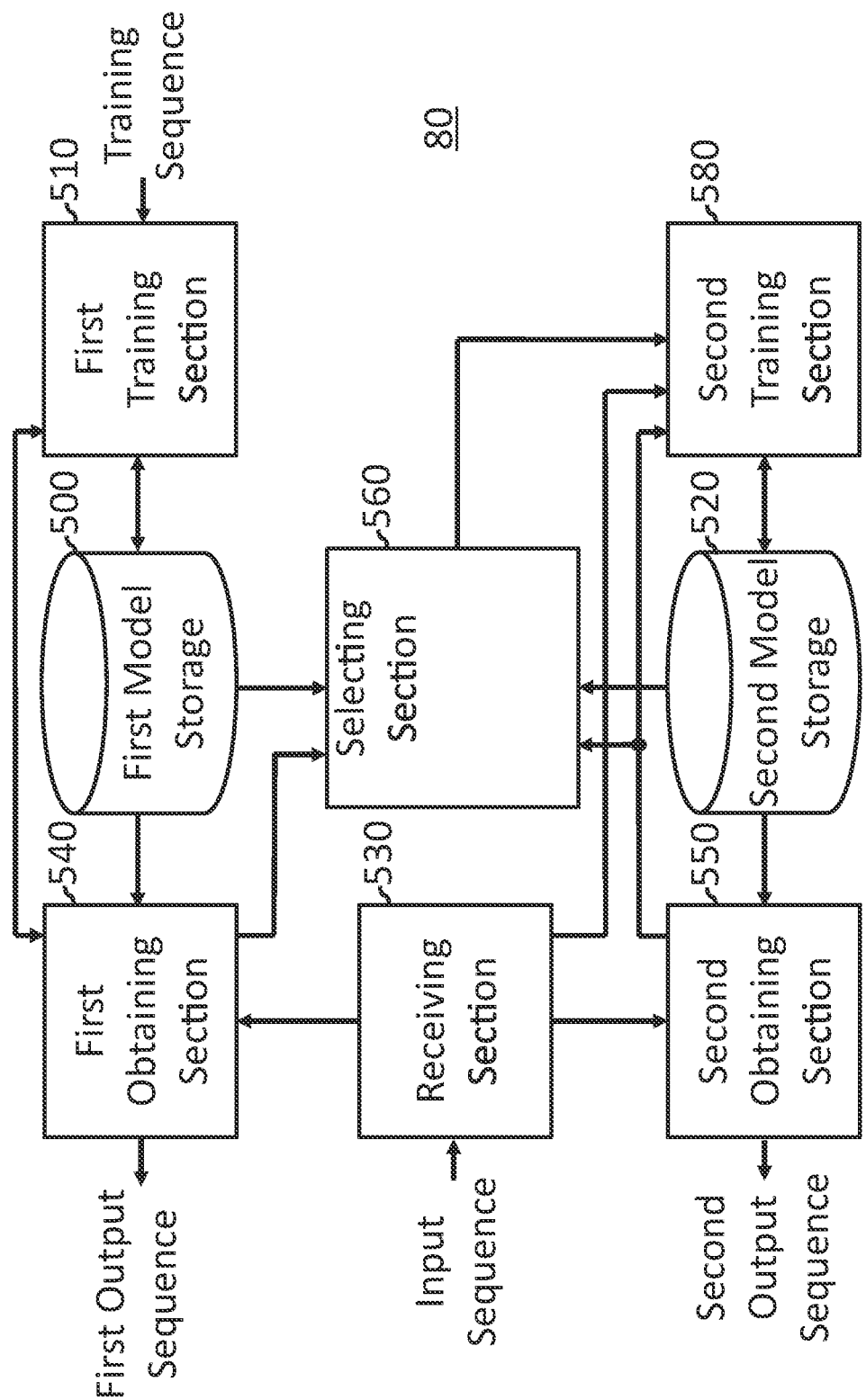
FIG. 8 shows an apparatus 80 according to an embodiment of the present invention.

FIG. 8 shows an apparatus 80 according to an embodiment of the present invention. Apparatus 80 is a variation of apparatus 50 in FIG. 5. The same reference number is assigned to each component in apparatus 80 which has similar functions and configurations of the corresponding component in apparatus 50. Hereinafter, only the differences from apparatus 50 in FIG. 5 are explained, and any other explanation of apparatus 50 in FIG. 5 can also generally be applied to apparatus 80 in FIG. 8.

Selecting section 560 of apparatus 80 does not include searching section 570 shown in FIG. 5. Instead of searching for the at least one first output in the first output sequence for each second output, selecting section 560 selects, for each second output, at least one first output from the first output sequence, wherein the at least one first output includes a first output that appears sequentially earlier in the first output sequence than the second output appears in the second sequence.

In this embodiment, selecting section 560 selects at least one first output within a range of a fixed length relative to the index of the second output. For example, selecting section 560 selects, for second output $y_i$ of interest, a fixed number (e.g. 5) of consecutive first outputs (e.g. $y'_{i-4}$ to $y'_i$) backward from a first output at the same index with the second output $y_i$ of interest. In other words, selecting section 560 sets an index window at a fixed relative location from the index of the second output of interest, and selects all first output in the index window for the second output of interest.

Selecting section 560 merges selected first outputs to obtain a training output by calculating a weighted sum of the first outputs, averaging the selected first outputs, and so on as shown in (5) explained in reference to FIG. 6. In this embodiment, apparatus 80 can obtain a training output for each second output of interest without searching the first output sequence, and thus apparatus 80 can reduce computational cost.

Figure 9:
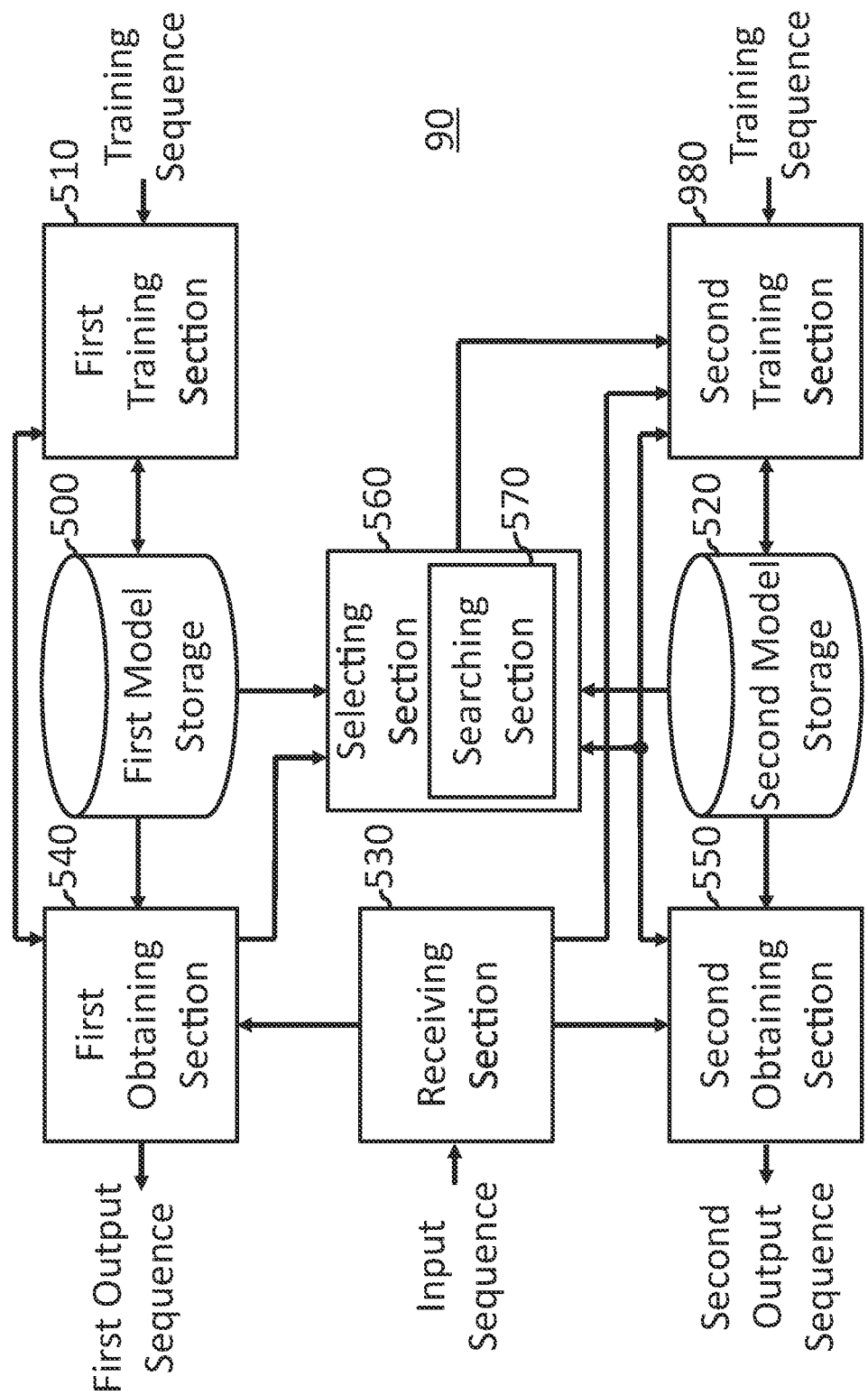
FIG. 9 shows an apparatus 90 according to an embodiment of the present invention.

FIG. 9 shows an apparatus 90 according to an embodiment of the present invention. Apparatus 90 is a variation of apparatus 50 in FIG. 5. The same reference number is assigned to each component in apparatus 90 which has similar functions and configurations of the corresponding component in apparatus 50. Hereinafter, only the differences from apparatus 50 in FIG. 5 are explained, and any other explanation of apparatus 50 in FIG. 5 can also generally be applied to apparatus 90 in FIG. 9.

Apparatus 90 includes second training section 980 instead of second training section 580 in apparatus 50, and the other components are substantially the same as in apparatus 50. Second training section 980 has substantially the same functions and configurations of second training section 580, and second training section 980 has additional function and configuration for training the unidirectional RNN model in second model storage 520 in a supervised training by using one or more pairs of a training input sequence and a training output sequence.

Second training section 980 receives one or more training sequences each including a pair of a training input sequence and a training output sequence. Second training section 980 sends the training input sequence to second obtaining section 550 and receives an output sequence of the current unidirectional RNN model stored in second model storage 520. Second training section 980 updates parameters of the unidirectional RNN model to decrease the difference between the training output sequence and the output sequence calculated by second obtaining section 550. In one implementation, second training section 980 trains the unidirectional LSTM model by using Connectionist Temporal Classification (CTC) training. Second training section 980 can adopt a known training algorithm for updating parameters of the bidirectional RNN model.

In this embodiment, apparatus 90 repeats a supervised training using one or more training sequences received by second training section 980 and teacher-student training using one or more input sequences received by receiving section 530, alternatively. Instead of this, apparatus 90 can train unidirectional RNN 10 by a supervised training at first, and after this training, apparatus 90 can train unidirectional RNN 10 by a teacher-student training.

In this embodiment, apparatus 90 can improve accuracy of unidirectional RNN 10 by combining a supervised training and a teacher-student training.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA®, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 10:
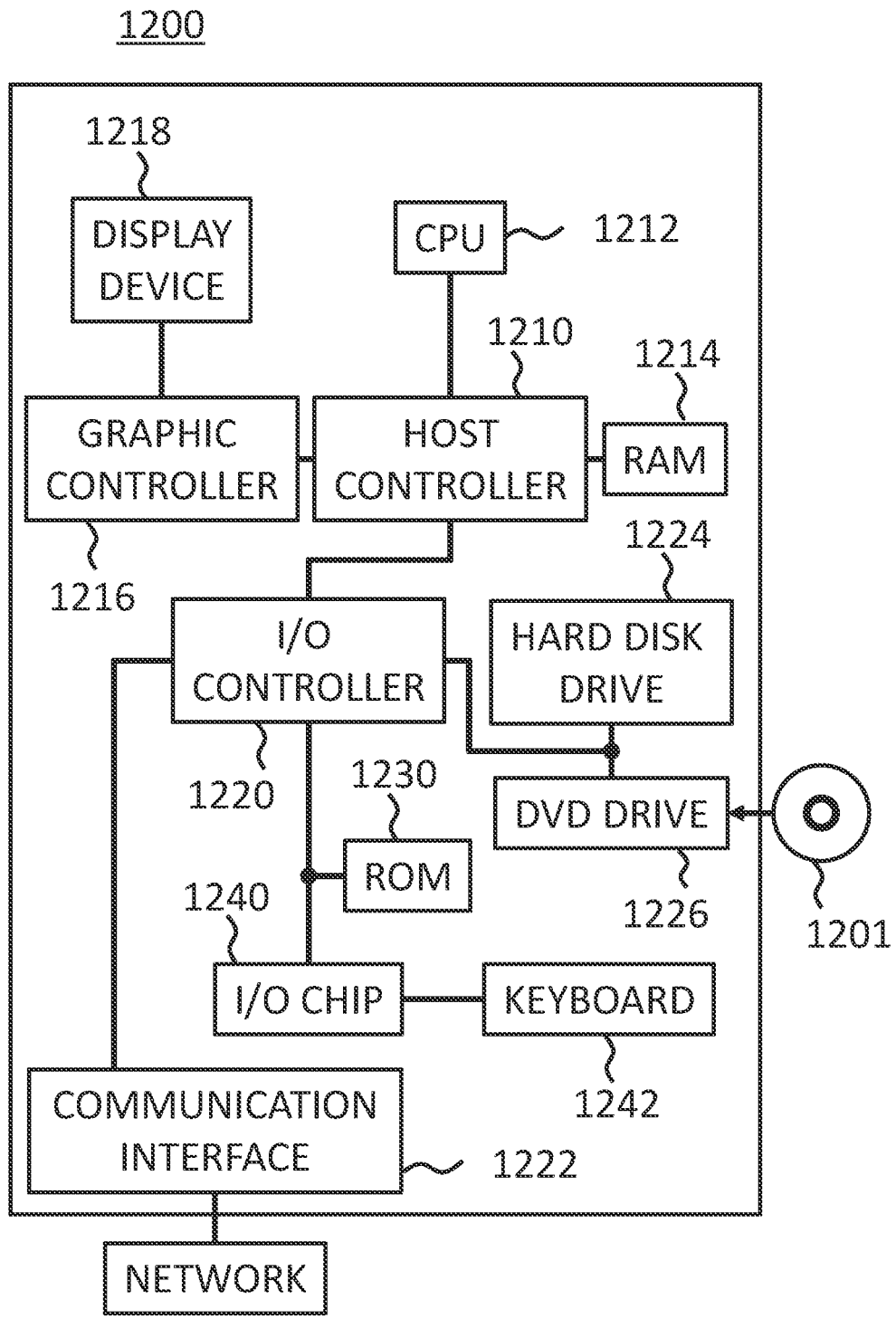
FIG. 10 shows an exemplary hardware configuration of a computer according to an embodiment of the present invention.

FIG. 10 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

In an embodiment of the present invention, one or more computers 1200 (shown in FIG. 10) may be configured to embody a bidirectional RNN model and a unidirectional RNN model. For example, a first model storage 500 (shown in FIG. 5) and a second model storage 520 may be provided in one or more hard disk drives 1224. A first training section 510 and a second training section 580 may be implemented by one or more processors, such as CPU 1212 executing program code stored on RAM 1214, ROM 1230 or the one or more hard disk drives 1226, collectively referred to as memory. Alternatively, the one or more processors (CPU 1212) may be dedicated neural network processors, machine learning processors or appropriately configured FPGA devices. Additionally, the selecting section 560 may be implemented by the one or more processors 1212 executing program code held in memory. Also, the one or more processors 1212 may execute program code held in memory to perform as a first obtaining section 540 and a second obtaining section 550. The receiving section 530 may be embodied in the I/O chip 1240 coupled to, for example, a microphone, and/or a communication interface 1222 coupled to a network.

The present embodiment may be used to implement a speech recognition system, for example. The present embodiment, implemented as a speech recognition system, may be configured to generate, by way of the first training section 510, a first phoneme sequence as a first output sequence corresponding to an input training sequence (e.g., input audio sequence of speech) received by the receiving section 530. The first phoneme sequence is generated by the bidirectional RNN model stored in the first model storage 500. A second phoneme sequence is generated, by way of the second training section 580, as a second output sequence corresponding to the input training sequence received by the receiving section 530. The second phoneme sequence is generated by the unidirectional RNN model stored in the second model storage 520.

The present embodiment may also select at least one first phoneme from the first phoneme sequence based on a similarity between the at least one first phoneme and a second phoneme from the second phoneme sequence. The at least one first phoneme generated by the bidirectional RNN model is used to train the unidirectional RNN model to increasing the similarity between the at least one first phoneme and the second phoneme.

The speech recognition system of the present embodiment may interpret a meaning of new second phoneme sequences generated by the trained unidirectional RNN model from input audio sequences received via the receiving section 530, for example, from the microphone coupled to the I/O chip 1240. Based on the interpreted meaning of the new second phoneme sequences the present embodiment controls an action performed by the device (e.g., the computer 1200). Actions of the device that may be controlled by the present embodiment may include activating an application, such as a music player (for example, when a phoneme sequence is interpreted as "play music"), transcribe the phoneme sequence into text, as in speech-to-text transcription system, translate the phoneme sequence from the native language into a target language, as in a speech translator system.

Additionally, the present embodiment may be configured to control external devices, for example smart home automation devices. For example, when the present embodiment interprets a new second phoneme sequence as "turn of the lights", the computer 1200 may control one or more smart light switches, or smart light bulbs by sending a control signal to the lighting devices by way of the communication interface 1222. In addition to controlling lighting devices, the present embodiment may be configured to interact with smart thermostats, smart appliances and other Internet of things enabled devices.

While the embodiments of the present invention have been described, the technical scope of the invention is not limited to the above described embodiments. It will be apparent to persons skilled in the art that various alterations and improvements can be added to the above-described embodiments. It should be also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining a first output sequence from a bidirectional Neural Network (NN) and selecting at least one first output from the first output sequence from the bidirectional NN based on a similarity between the at least one first output and a second output from a second output sequence obtained from a unidirectional NN determined by comparing the second output with each of the at least one first output at different sequential time indices in the second output sequence and the first output sequence, respectively; and
    training the unidirectional NN to increase the similarity between the at least one first output and the second output to improve accuracy by aligning distributions of the at least one first output and the second output, the training the unidirectional NN being executed after training the bidirectional NN, the training the bidirectional NN including decreasing a difference between the at least one first output and the second output by updating parameters of the unidirectional NN during the training.

2. The computer-implemented method of claim 1, wherein the at least one first output includes an output that appears sequentially earlier in the first output sequence than the second output appears in the second output sequence.

3. The computer-implemented method of claim 1, wherein selecting the at least one first output includes searching for the at least one first output within a predetermined range in the first output sequence, wherein the predetermined range is determined from an index of the second output in the second output sequence.

4. The computer-implemented method of claim 1, wherein selecting the at least one first output includes selecting, for each second output from the second output sequence, at least one first corresponding output from the first output sequence, wherein each second output appears in a same relative sequential order in the second output sequence as each of the at least one corresponding first output in the first output sequence.

5. The computer-implemented method of claim 1, further comprising training the unidirectional NN to increase a similarity between a first distribution of the at least one first output and a second distribution of the second output.

6. The computer-implemented method of claim 5, wherein training the unidirectional NN includes training the unidirectional NN to decrease Kullback-Leibler (KL) divergence between the first distribution and the second distribution.

7. The computer-implemented method of claim 5, wherein the first distribution is a weighted sum of distributions of each of the at least one first output.

8. The computer-implemented method of claim 7, wherein selecting the at least one first output includes determining weights of the weighted sum of distributions of each of the at least one first output based on similarity of distribution of each of the at least one first output individually compared with the second output.

9. The computer-implemented method of claim 1, further comprising training the bidirectional NN before training the unidirectional NN.

10. The computer-implemented method of claim 1, wherein the bidirectional NN is a bidirectional Long Short-Term Memory (LSTM) and the unidirectional NN is a unidirectional LSTM.

11. The computer-implemented method of claim 10, further comprising training the unidirectional LSTM by using Connectionist Temporal Classification (CTC) training.

12. The computer-implemented method of claim 1, wherein an input sequence is obtained from the first output sequence and from the second output sequence, and is an audio sequence of a speech, and the first output sequence and the second output sequence are phoneme sequences.

13. A computer program product including one or more computer readable storage mediums collectively storing program instructions that are executable by a processor or programmable circuitry to cause the processor or programmable circuitry to perform operations comprising:
    obtaining a first output sequence from a bidirectional Neural Network (NN) and selecting at least one first output from the first output sequence from the bidirectional NN based on a similarity between the at least one first output and a second output from a second output sequence obtained from a unidirectional NN determined by comparing the second output with each of the at least one first output at different sequential time indices in the second output sequence and the first output sequence, respectively, and
    training the unidirectional NN to increase the similarity between the at least one first output and the second output to improve accuracy by aligning distributions of the at least one first output and the second output, the training the unidirectional NN being executed after training the bidirectional NN, the training the bidirectional NN including decreasing a difference between the at least one first output and the second output by updating parameters of the unidirectional NN during the training.

14. The computer program product of claim 13, wherein selecting the at least one first output includes searching for the at least one first output within a predetermined range in the first output sequence, wherein the predetermined range is determined from an index of the second output in the second output sequence.

15. The computer program product of claim 13, further comprising training the unidirectional NN to increase the similarity between a first distribution of the at least one first output and a second distribution of the second output.

16. The computer program product of claim 15, wherein the first distribution is a weighted sum of distributions of each of the at least one first output.

17. An apparatus comprising:
    a processor or a programmable circuitry; and
    one or more computer readable mediums collectively including instructions that, when executed by the processor or the programmable circuitry, cause the processor or the programmable circuitry to:
        obtain a first output sequence from a bidirectional Neural Network (NN) and select at least one first output from the first output sequence from the bidirectional NN based on a similarity between the at least one first output and a second output from a second output sequence obtained from a unidirectional NN determined by comparing the second output with each of the at least one first output at different sequential time indices in the second output sequence and the first output sequence, respectively; and
        train the unidirectional NN to increase the similarity between the at least one first output and the second output to improve accuracy by aligning distributions of the at least one first output and the second output, the unidirectional NN being trained after training the bidirectional NN, the training the bidirectional NN including decreasing a difference between the at least one first output and the second output by updating parameters of the unidirectional NN during the training.

18. The apparatus of claim 17, wherein the instructions that cause the processor or the programmable circuitry to select the at least one first output include instructions that cause the processor or the programmable circuitry to search for the at least one first output within a predetermined range in the first output sequence, wherein the predetermined range is determined from an index of the second output in the second output sequence.

19. The apparatus of claim 17, wherein instructions that cause the processor or the programmable circuitry to train the unidirectional NN include instructions that cause the processor or the programmable circuitry to train the unidirectional NN to increase a similarity between a first distribution of the at least one first output and a second distribution of the second output.

20. The apparatus of claim 19, wherein the first distribution is a weighted sum of distributions of each of the at least one first output.

* * * * *